(12) United States Patent
Kwak et al.

(10) Patent No.: US 10,732,672 B2
(45) Date of Patent: *Aug. 4, 2020

(54) ELECTRONIC DEVICE WITH SCREEN

(71) Applicant: Samsung Electronics Co., Ltd., Gyeonggi-do (KR)

(72) Inventors: Woon Geun Kwak, Gyeonggi-do (KR); Jung Sik Park, Gyeonggi-do (KR); Do Hun Cha, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/444,437

(22) Filed: Jun. 18, 2019

(65) Prior Publication Data

US 2019/0302843 A1    Oct. 3, 2019

Related U.S. Application Data

(63) Continuation of application No. 15/997,281, filed on Jun. 4, 2018, now Pat. No. 10,324,493, which is a (Continued)

(30) Foreign Application Priority Data

Apr. 9, 2015    (KR) .......................... 10-2015-0050406

(51) Int. Cl.
  *H05K 9/00* (2006.01)
  *G06F 1/16* (2006.01)
  *H04M 1/02* (2006.01)

(52) U.S. Cl.
  CPC .......... *G06F 1/1626* (2013.01); *G06F 1/1637* (2013.01); *G06F 1/1643* (2013.01); *G06F 1/1656* (2013.01); *H04M 1/0266* (2013.01)

(58) Field of Classification Search
  USPC ......................................................... 361/818
  See application file for complete search history.

(56) References Cited

U.S. PATENT DOCUMENTS

9,189,016 B2    11/2015  Jang
9,342,105 B2     5/2016  Choi
(Continued)

FOREIGN PATENT DOCUMENTS

KR    10-2014-0002364    1/2014
KR    10-2014-0061934    5/2014

OTHER PUBLICATIONS

European Search Report dated Sep. 2, 2016 issued in counterpart application No. 16164455.4-1972, 8 pages.

*Primary Examiner* — Hung S. Bui
(74) *Attorney, Agent, or Firm* — The Farrell Law Firm, P.C.

(57) ABSTRACT

A portable communication device is provided. The portable communication device includes a window having a flat window area and a curved window area extending from the flat window area. In addition, the portable communication device includes a display disposed beneath the window and including a flat display area, a curved display area extending from the flat display area, and a wiring area extending from the curved display area. Additionally, the portable communication device includes a fixed part supporting at least one portion of the flat display area and at least one portion of the curved display area, and a bracket supporting at least one portion of the curved display area and at least one portion of the wiring area.

20 Claims, 11 Drawing Sheets

Related U.S. Application Data continuation of application No. 15/095,354, filed on Apr. 11, 2016, now Pat. No. 9,989,995.

(56) References Cited

U.S. PATENT DOCUMENTS

| | | |
|---|---|---|
| 2008/0223708 A1 | 9/2008 | Joo |
| 2010/0317409 A1 | 12/2010 | Jiang |
| 2013/0002133 A1 | 1/2013 | Jin |
| 2013/0241855 A1 | 9/2013 | Kim |
| 2014/0036195 A1 | 2/2014 | Kuo et al. |
| 2014/0104762 A1 | 4/2014 | Park |
| 2014/0132488 A1 | 5/2014 | Kim et al. |
| 2014/0168090 A1 | 6/2014 | Aaltonen et al. |
| 2014/0253477 A1 | 9/2014 | Shim et al. |
| 2014/0355227 A1 | 12/2014 | Lim |
| 2015/0331451 A1 | 11/2015 | Shin |
| 2016/0066440 A1 | 3/2016 | Choi |
| 2016/0110003 A1 | 4/2016 | Shim et al. |

ELECTRONIC DEVICE WITH SCREEN

PRIORITY

This application is a continuation of U.S. patent application Ser. No. 15/997,281, which was filed in the United States Patent and Trademark Office on Jun. 4, 2018, which issued as U.S. Pat. No. 10,324,493 on Jun. 18, 2019, which is a continuation of U.S. application Ser. No. 15/095,354, which was filed in the United States Patent and Trademark Office on Apr. 11, 2016, which issued as U.S. Pat. No. 9,989,995 on Jun. 5, 2018, which claims priority under 35 U.S.C. § 119(a) to Korean Patent Application Serial No. 10-2015-0050406, which was filed in the Korean Intellectual Property Office on Apr. 9, 2015, the entire content of which is incorporated herein by reference.

BACKGROUND

1. Field of the Disclosure

The present disclosure generally relates to an electronic device, and more particularly, to an electronic device capable of expanding a screen area by reducing a bezel area.

2. Description of the Related Art

An electronic device, such as a smartphone or a tablet, provides such functions as an image output, a video reproduction, and the like through a screen. A bezel area exists on the periphery surrounding a screen of the electronic device. The bezel area is an area where wires for transmitting input/output signals to the screen are arranged and are invisible to a user by covering the bezel area with a separate case or adjust the transparency of a window panel. Various trials are made to provide the largest screen to the user by reducing the bezel area within a limited size range of the electronic device.

In a conventional electronic device, a bezel area may be minimized by reducing an area occupied by wires of a display panel. However, such an approach is only an attempt to minimize the bezel area and is problematic to implement a bezel-less screen.

Conventionally, a bezel area exists within a certain range even though separate display areas are respectively added on side surfaces of an electronic device for expansion, thereby making it difficult to maximize the width of a screen.

SUMMARY

Aspects of the present disclosure are to address at least the above-mentioned problems and/or disadvantages and to provide at least the advantages described below. Accordingly, an aspect of the present disclosure is to provide a portable communication device capable of expanding a screen area by reducing a bezel area.

In accordance with an aspect of the present disclosure, a portable communication device includes a window having a flat window area and a curved window area extending from the flat window area. In addition, the portable communication device includes a display disposed beneath the window and including a flat display area, a curved display area extending from the flat display area, and a wiring area extending from the curved display area. Additionally, the portable communication device includes a fixed part supporting at least one portion of the flat display area and at least one portion of the curved display area, and a bracket supporting at least one portion of the curved display area and at least one portion of the wiring area.

In accordance with another aspect of the present disclosure, a portable communication device includes a window including a flat window area and a curved window area extending from the flat window area. In addition, the portable communication device includes a display disposed beneath the window and including a flat display area, a curved display area extending from the flat display area, and a wiring area extending from the curved display area. Additionally, the portable communication device includes a fixed part disposed beneath the display and supporting the flat display area, the curved display area and the wiring area.

In accordance with another aspect of the present disclosure, a portable communication device includes a window including at least one portion of a curved area. In addition, the portable communication device includes a flexible display disposed beneath at least one portion of the window, and including a display area corresponding to the window and a wiring area extending from the display area. Additionally, the portable communication device includes a fixed part supporting a same side of at least one portion of the display area and at least one portion of the wiring area.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that similar reference numerals may be used to depict the same or similar elements, features, and structures.

DETAILED DESCRIPTION

Figure 1:
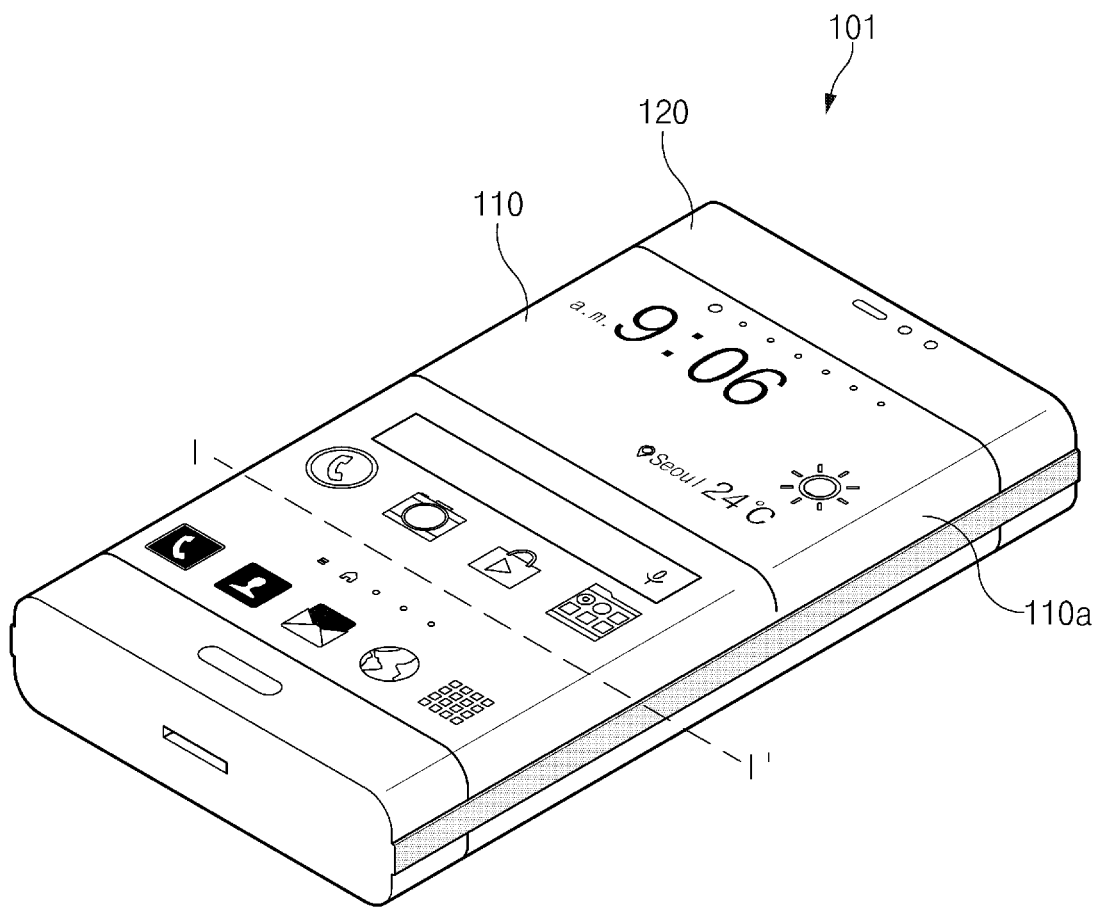
FIG. 1 is a perspective view of an electronic device according to various embodiments of the present disclosure.

Hereinafter, various embodiments of the present disclosure will be described with reference to accompanying drawings. Accordingly, those of ordinary skill in the art will recognize that modifications, equivalents, and/or alternative of the various embodiments described herein can be made without departing from the scope and spirit of the present disclosure. With regard to descriptions of drawings, similar components may be designated by similar reference numerals.

In the present disclosure, the expressions "have", "may have", "include" and "comprise", or "may include" and "may comprise" used herein indicate existence of corresponding features (e.g., elements such as numeric values, functions, operations, or components) but do not exclude the presence of additional features.

In the present disclosure, the expressions "A or B", "at least one of A or/and B", or "one or more of A or/and B", and the like, used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The expressions, such as "first", "second", and the like used herein may refer to various elements of various embodiments of the present disclosure, but do not limit the elements. Furthermore, such expressions may be used to distinguish one element from another element. For example, "a first user device" and "a second user device" indicate different user devices regardless of the order or importance. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it will be understood that there are no intervening elements (e.g., a third element).

According to the situation, the expression "configured to" used herein may be used interchangeably with, the expressions "suitable for", "having the capacity to", "designed to", "adapted to", "made to", or "capable of". The expression "configured to" may not necessarily imply only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a general-purpose processor (e.g., a central processing unit (CPU) or an application processor) which may perform corresponding operations by executing one or more software programs which are stored in a memory device.

Terms used in this specification are used to describe specified embodiments of the present disclosure and do not limit the scope of the present disclosure. Terms in a singular form may include plural forms unless otherwise specified. Unless otherwise defined herein, all the terms used herein, which include technical or scientific terms, may have the same meaning that is generally understood by a person skilled in the related art. It will be further understood that terms, which are defined in a dictionary and commonly used, should also be interpreted as is customary in the relevant related art and not in an idealized or overly formal definition unless expressly so defined herein, in various embodiments of the present disclosure. In some cases, even if terms are terms which are defined in the specification, they are not to be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to various embodiments of the present disclosure, the electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to various embodiments of the present disclosure, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, ultrasonic devices, navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller machines (ATMs), points of sales (POSs) devices, or Internet of Things devices (e.g., light bulbs, various sensors, electric or gas meters, sprinkler devices, fire alarms, thermostats, street lamps, toasters, exercise equipment, hot water tanks, heaters, boilers, and the like).

According to various embodiments of the present disclosure, the electronic devices may include at least one of parts of furniture or buildings/structures, electronic boards, electronic signature receiving devices, projectors, or various measuring instruments (e.g., water meters, electricity meters, gas meters, or wave meters, and the like). The electronic device may be one of the above-described devices or a combination thereof. An electronic device may be a flexible electronic device. Also, electronic devices according to various embodiments of the present disclosure are not limited to the above-mentioned devices, and may include new electronic devices according to technology development.

Hereinafter, electronic devices according to various embodiments of the present disclosure will be described with reference to the accompanying drawings. The term "user" as used herein may refer to a person who uses an electronic device or may refer to a device (e.g., an artificial intelligence electronic device) that uses an electronic device.

FIG. 1 is a perspective view of an electronic device according to various embodiments of the present disclosure.

Referring to FIG. 1, an electronic device 101 includes a display 110 and a body 120.

The electronic device 101 may not include a separate bezel area on left and right side surfaces thereof. In the case where bezel areas of the left and right side surfaces are removed, a screen may be wider compared with the case where a bezel exists, and a design may be simplified. Furthermore, it may be possible to implement a large screen on a terminal of a relatively small size.

The display 110 may display a variety of pieces of content (e.g., a text, an image, a video, an icon, a symbol, and the like) to a user. The display 110 may include a touch screen and may receive, for example, a touch input, a gesture input, a proximity input, or a hovering input using an electronic pen or a portion of a user's body.

According to various embodiments of the present disclosure, the display 110 may extend to left and right side surfaces of the electronic device 101. A front surface of the display 110 may maintain a planar shape, and points 110a of the display 110 adjacent to the left and right sides of the electronic device 101 may be curved to be convex toward the outside. Left and right ends of the display 110 may be connected with a side case of the electronic device 101.

A window panel surrounding an outer surface of the display 110 may extend toward the left and right side surfaces of the electronic device 101. A wiring area of a display panel may be seated in a bracket so as to be invisible through the window panel. A description of the extension of the display 110 and removal of the bezel area will be given in detail with reference to FIGS. 2 to 9.

The body 120 may be a peripheral area surrounding the display 110. The body 120 may include a speaker, a microphone, various sensors, buttons, and the like, on upper and lower sides of the display 110.

The body 120 may include a circuit, which powers the display 110 and transmits various signals (e.g., a control signal, an input/output signal, and the like) in the interior thereof.

The body 120 may include a bracket for mounting the display 110 or various internal parts and circuits in the interior thereof. The bracket may fix and protect various parts or circuits including the display 110. The bracket may be formed using a plastic injection-molding process and the like. According to various embodiments of the present disclosure, the outside of the body 120 may be formed by exposing a portion of the bracket or may be formed by coupling a case formed of a separate material (e.g., plastic, metal, and the like) to a portion of the bracket.

Figure 2:
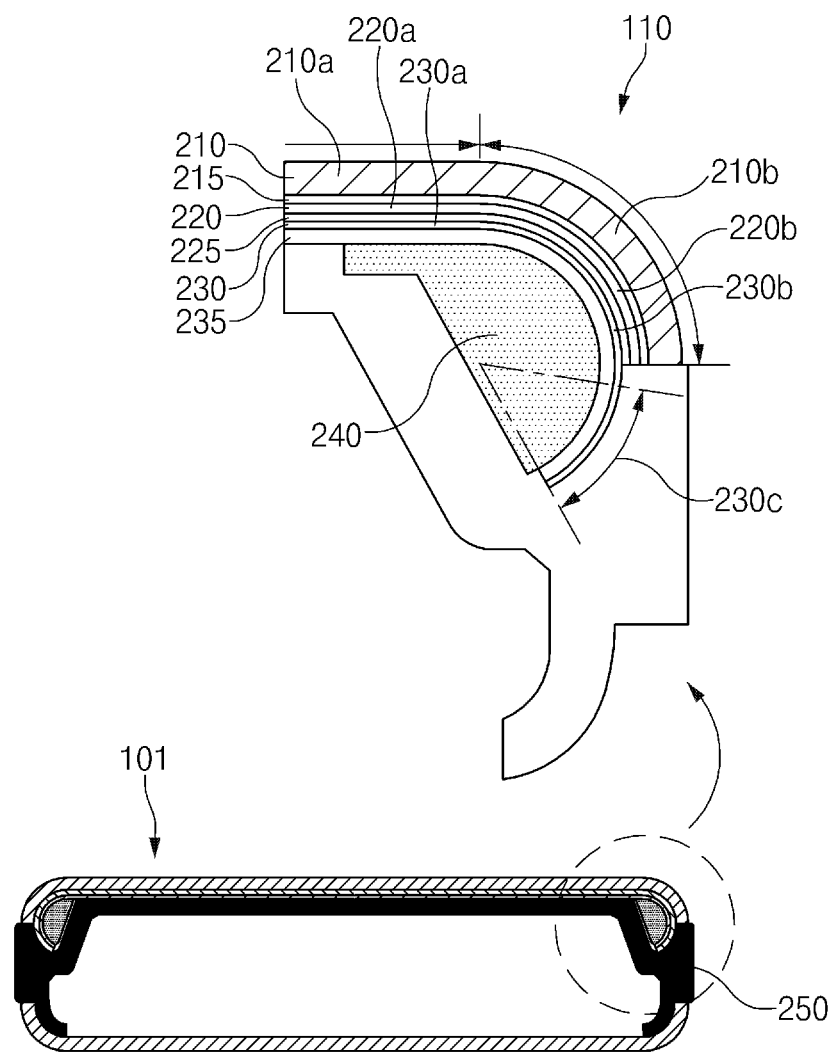
FIG. 2 is a sectional view of an electronic device according to various embodiments of the present disclosure.

FIG. 2 is a sectional view of an electronic device according to various embodiments of the present disclosure. A section of the electronic device 101 taken along a line I-I' of FIG. 1 is illustrated in FIG. 2, but the present disclosure is not limited thereto.

Referring to FIG. 2, left and right side surfaces of the display 110 have a curved shape which is convex toward the outside of the electronic device 101. The display 110 is curved smoothly on the left and right side surfaces of the electronic device 101 and may prevent a panel inside the display 110 from being damaged. Furthermore, the display 110 may have a continuously curved shape, thereby making it possible to provide an ergonomic sense of grip when a user grips the electronic device 101.

The display 110 may be implemented in a stack structure where a window panel 210, a touch panel 220, and a display panel 230 are sequentially stacked. Furthermore, the display 110 may include adhesive layers 215, 225, and 235 which are used to bond corresponding panels, respectively. Each of the adhesive layers 215, 225, and 235 may perform functions of preventing corresponding panels from be separated, respectively and may be formed of optically clear adhesive (OCA), synthetic resins, and the like. According to various embodiments of the present disclosure, at least one of opposite ends of the window panel 210 or the display panel 230 may be formed to have a hook shape. The hook shape may allow the window panel 210 or the display panel 230 to be stopped and coupled to each other by a bracket 250. The bracket 250 may have a structure corresponding to the hook shape.

The window panel 210 may be disposed at the uppermost portion of the display 110 and may protect the touch panel 220 or the display panel 230. The window panel 210 may be formed of glass, poly carbonate (PC), poly methyl meth acrylate (PMMA), and the like.

The window panel 210 may extend toward side surface areas of the electronic device 101. In this case, the window panel 210 may be classified into a front area 210a having a planar shape and a curved area 210b having a curved shape. However, the classification of the front area 210a and the curved area 210b may be based only on their shapes, and the window panel 210 may be integrally formed of one material on a front surface and side surfaces of the electronic device 101.

The front area 210a may be an area disposed toward the front surface of the electronic device 101 and may have a planar shape. A user may identify a text, an image, and the like displayed through the front area 210a. Curved areas 210b may be disposed at the left and right side surfaces of the front area 210a, respectively. The front area 210a may be formed with the same material as that of the curved area 210b extending toward the left and right sides of the front area 210a.

The curved areas 210b may be areas which extend from the front area 210a and are curved at specific curvatures at the left and right side surfaces of the electronic device 101 so as to be convex toward the outside of the electronic device 101. The curvatures of the curved areas 210b may vary according to a design requirement. Furthermore, the curvatures may be determined by a shape of the touch panel 220 or the display panel 230, a material thereof, and the like.

According to various embodiments of the present disclosure, the curved area 210b may extend to a specific range of the side surface of the electronic device 101. For example, the curved area 210b may extend to a central portion of the side surface of the electronic device 101 (or a case if the case is separately coupled to a bracket) where the bracket 250 is exposed. As another example, the curved area 210b may extend to a point where the curved area 210b is perpendicular to the front area 210a.

According to various embodiments of the present disclosure, the curved area 210b may have the same height as that of the bracket 250 (or an external case coupled to the bracket 250) exposed to the outside or have a height difference within a specific range. Accordingly, the side surface of the electronic device 101 may have a smooth surface without a step and may be formed to have a simplified shape in an aspect of design.

The touch panel 220 may be disposed between the window panel 210 and the display panel 230. The touch panel 220 may be formed of a light transmittance material, and an output signal to be displayed through the display panel 230 may pass through the touch panel 220. In FIG. 2, the touch panel 220 is included in the display 110. However, the scope and spirit of the present disclosure is not limited thereto. For example, the display panel 110 may be implemented without a touch function to allow the window panel 210 and the display panel 230 to be adhered through an adhesive layer.

The touch panel 220 may be formed of a flexible material (e.g., a flexible transparent film), and at least a portion thereof may be implemented to be curved. Like the window panel 210, the touch panel 220 may include a front touch area 220*a* and a side touch area 220*b*. Like the curved area 210*b* of the window panel 210, the side touch area 220*b* may be formed to be convex toward the outside of the electronic device 101.

According to various embodiments of the present disclosure, a shape of the side touch area 220*b* may correspond to a shape of the curved area 210*b* of the window panel 210. The side touch area 220*b* may be adhered and attached to an inner surface of the curved area 210*b* of the window panel 210 through the adhesive layer 215. The side touch area 220*b* may have a curved surface corresponding to an inner curved surface of the curved area 210*b*. Furthermore, the side touch area 220*b* may have the same length as that of the curved area 210*b* or may maintain a length difference within a specific range. For example, all ends of the curved area 210*b* and the side touch area 220*b* may extend to points where they are in contact with the bracket 250 at a lateral side.

The display panel 230 may be disposed under the touch panel 220. The display panel 230 may display an image based on an electrical signal from the electronic device 101. The display panel 230 may be a liquid crystal display (LCD) panel, an organic light emitting diode (OLED) panel, and the like. According to various embodiments of the present disclosure, the display panel 230 may be formed of a flexible material and may be curved on side surfaces of the electronic device 101 so as to have a shape similar to those of the window panel 210 and the touch panel 220.

The display panel 230 may include a front display area 230*a*, a side display area 230*b*, and a wiring area 230*c*.

The front area 230*a* may be an area corresponding to the front area 210*a* of the window panel 210 or the front touch area 220*a* and may have a planar shape.

The side display area 230*b* may be an area which extends to the left and right sides of the front display area 230*a* so as to be curved. The side display area 230*b* may be curved at a specific radius of curvature so as to be convex toward the outside of the electronic device 101. According to various embodiments of the present disclosure, the side display area 230*b* may display texts, images, icons, and the like, which are different from those of the front display area 230*a*. For example, a video file may be reproduced on the front display area 230*a*, and a touch button (e.g., stop/play/fast forward/rewind) for controlling the video file may be displayed on the side display area 230*b*.

A shape of the side display area 230*b* may correspond to a shape of the side touch area 220*b* of the touch panel 220. The side display area 230*b* may be adhered and attached to an inner surface of the side touch area 220*b* of the touch panel 220 through the adhesive layer 225. The side display area 230*b* may have a curved surface which is equal to an inner curved surface of the side touch area 220*b*. According to various embodiments of the present disclosure, a curvature of the side display area 230*b* may be greater than that of the curved area 210*b* of the window panel 210 or the side touch area 220*b* of the touch panel 220.

According to various embodiments of the present disclosure, a length of the side display area 230*b* may be greater than or equal to that of the curved area 210*b* of the window panel 210 or the side touch area 220*b* of the touch panel 220. For example, in the case where the curved area 210*b* and the side touch area 220*b* extend to a side central point of the electronic device 101, the side display area 230*b* may be formed to pass through the side center point. In the case where the user views the electronic device 101 from the outside, the wiring area 230*c* may be invisible because it is provided inside the bracket 250. In the case where the user views the electronic device 101 from the outside, the user may identify that a bezel is not present (i.e., a bezel-less state).

According to various embodiments of the present disclosure, in the case where a length of the side display area 230*b* is larger than that of the curved area 210*b* or the side touch area 220*b*, the side display area 230*b* may continuously maintain a shape which is convex toward the outside. As such, opposite ends of the display panel 230 may maintain a shape in which the opposite ends of the display panel 230 burrow into the inside of the electronic device 101 (or toward the inside of the bracket 250). In this case, the wiring area 230*c* extending from the side display area 230*b* may be more distant from a side surface of the electronic device 101, thereby reducing the probability of generating a bezel area.

The wiring area 230*c* may be a portion extending from the side display area 230*b*. The wiring area 230*c* may not be a separate screen display area but an area where wires for transmitting signals for a screen output of the display panel 230 are disposed. According to various embodiments of the present disclosure, the wiring area 230*c* may be curved to be convex toward the outside at the same radius of curvature as that of the side display area 230*b*. As such, the wiring area 230*c* may burrow into the inside of the bracket 250 deeper than the side display area 230*b*.

Conventionally, since a wiring area of a display panel passes through a window panel, a black matrix (BM) area where no screen is displayed may be generated. For this reason, an actual screen area may be reduced. In contrast, the electronic device 101 according to various embodiments of the present disclosure may have a shape in which the wiring area 230*c* is hidden inside the bracket 250. As such, the user may not identify a separate BM area on a front surface or a side surface of the electronic device 101.

According to various embodiments of the present disclosure, the wiring area 230*c* may be bonded to a fixed part 240 so as to be bendable. The wiring area 230*c* may be fixed to a seating area formed in the bracket 250 together with a part of the fixed part 240. A description of the bracket 250 will be provided with reference to FIG. 3.

According to various embodiments of the present disclosure, the electronic device 101 may further include the fixed part 240 for supporting the curved shapes of the side display area 230*b* and the wiring area 230*c* of the display panel 230.

The fixed part 240 may have a semi-cylindrical shape or a cylindrical shape which is curved to be convex toward the side display area 230*b* or the wiring area 230*c*. A surface corresponding to the curved surface of the fixed part 240 may be bonded to the side display area 230*b* and the wiring area 230*c* through the adhesive layer 235. The fixed part 240 may have a shape corresponding to shapes of the curved surfaces of the side display area 230*b* and the wiring area 230*c*.

The fixed part 240 may allow the side display area 230*b* and the wiring area 230*c* to maintain curved shapes thereof at a specific radius of curvature. The fixed part 240 may prevent a gap from be generated while opposite ends of the display panel 230 are curved. Furthermore, the fixed part 240 may prevent moisture or dust from flowing along an adhesive layer while an adhesive force is weakened.

According to various embodiments of the present disclosure, at least a portion of the fixed part 240 may extend to a lower portion of the front display area 230a. As such, the fixed part 240 may firmly fix the side display area 230b and the wiring area 230c on a side surface of the electronic device 101. Furthermore, the fixed part 240 may be bonded with the bracket 250 or may be fixed through a separate coupling structure. A description of the coupling structure will be provided with reference to FIG. 4.

Figure 3:
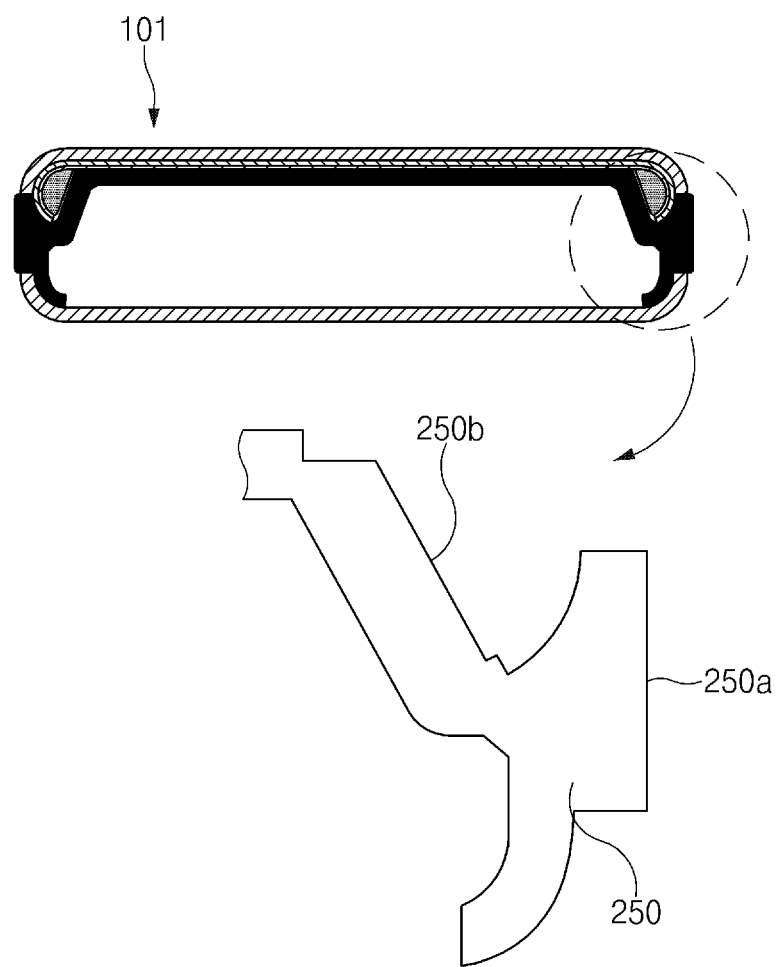
FIG. 3 is a sectional view illustrating a shape of a side bracket according to various embodiments of the present disclosure.

FIG. 3 is a sectional view illustrating a shape of a side bracket according to various embodiments of the present disclosure. A shape of a bracket of FIG. 3 is only exemplary and is not limited thereto.

The electronic device 101 may include the bracket 250 for mounting the display 110 or various internal components and circuits therein. The bracket 250 may fix and protect various parts or circuits including the display 110. The bracket 250 may be formed using a plastic injection-molding process or the like.

According to various embodiments of the present disclosure, at least a portion of the bracket 250 may be exposed from a side surface of the electronic device 101 so as to define a side appearance 250a of the electronic device 101. In FIG. 3, the side appearance 250a of the electronic device 101 is defined by an exposed portion of the bracket 250. However, the scope and spirit of the present disclosure is not limited thereto. For example, the side appearance 250a may be defined by a case which is made of a separate material (e.g., plastic, metal, and the like) and is coupled to a portion of the bracket 250.

According to various embodiments of the present disclosure, the bracket 250 may include a seating area 250b for fixing at least a portion of the fixed part 240 or the wiring area 230c on left and right sides of the electronic device 101. The seating area 250b may be disposed below the fixed part 240. Furthermore, the seating area 250b may have a groove shape or a valley shape which corresponds to a shape of a lower portion of the fixed part 240. In FIG. 3, a shape of the seating area 250b corresponds to the semi-cylindrical shape of the fixed part 240. However, the scope and spirit of the present disclosure is not limited thereto. For example, the seating area 250b may have various shapes based on the shape of the fixed part 240.

Figure 4:
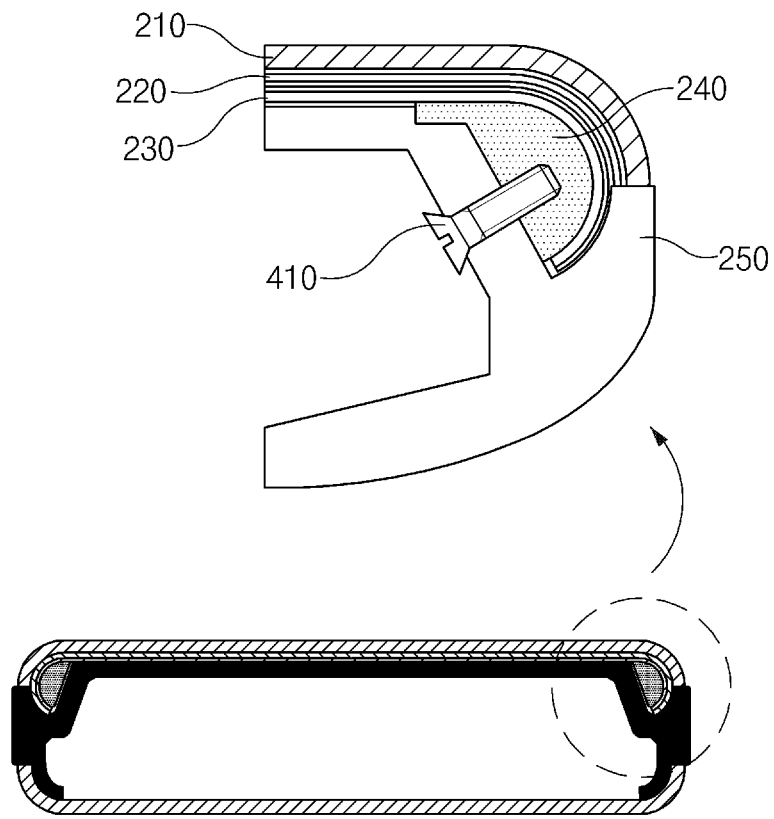
FIG. 4 is a sectional view illustrating a joint for fastening a fixed part, according to various embodiments of the present disclosure.

FIG. 4 is a sectional view illustrating a joint for fastening a fixed part, according to various embodiments of the present disclosure.

Referring to FIG. 4, the electronic device 101 further includes a joint for coupling the fixed part 240 and the bracket 250.

The joint 410 may penetrate the bracket 250 toward the fixed part 240 from a side opposite to the side where the display panel 230 is disposed so as to be inserted into the fixed part 240. In FIG. 4 the joint 410 is inserted in a screw manner. However, the scope and spirit of the present disclosure is not limited thereto.

The joint 410 may be formed of a material which is more rigid than the fixed part 240 or the bracket 250. In FIG. 4, one joint 410 is inserted. However, the scope and spirit of the present disclosure is not limited thereto. For example, a plurality of joints 410 may be provided according to requirements.

Figure 5:
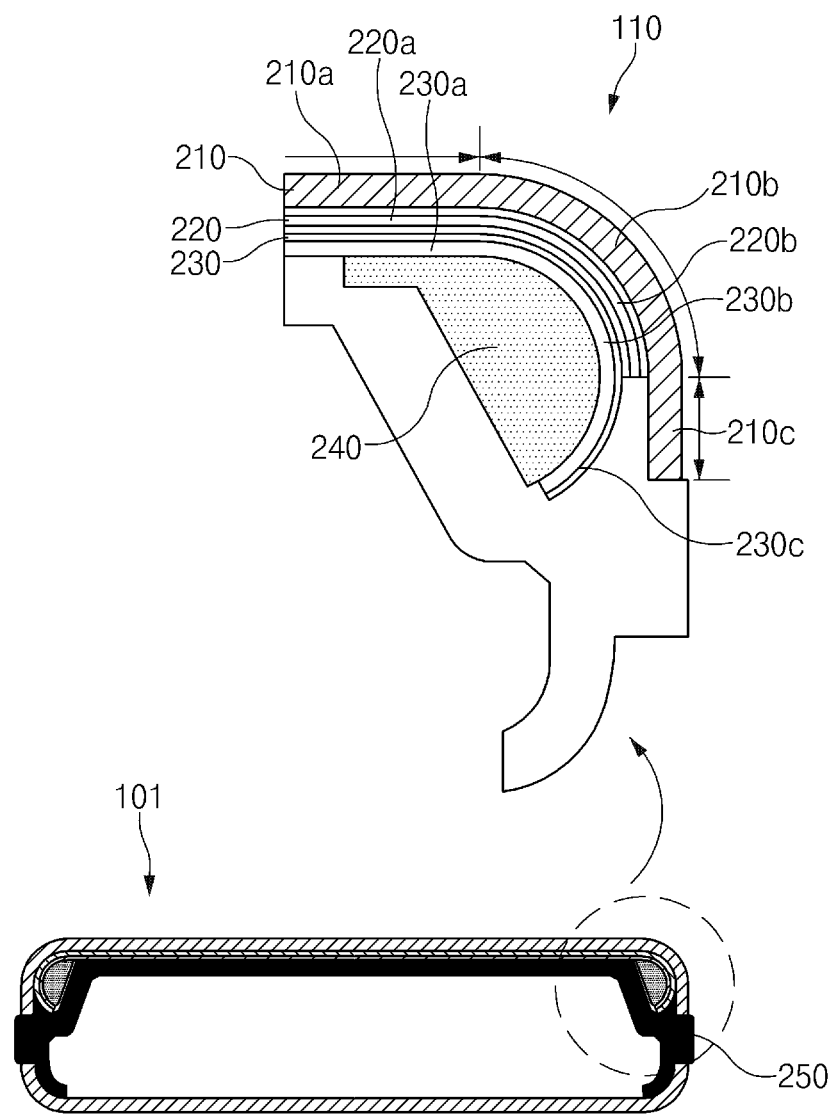
FIG. 5 is a sectional view illustrating a window panel, according to various embodiments of the present disclosure.

FIG. 5 is a sectional view illustrating a window panel, according to various embodiments of the present disclosure.

Referring to FIG. 5, the window panel 210 additionally extends toward a lower end of the electronic device 101 from a side surface of the electronic device 101. The window panel 210 includes the front area 210a, the curved area 210b, and an additional area 210c. The additional area 210c may be distinguished from the front area 210a and the curved area 210b according to their shapes, and the window panel 210 may be integrally formed of one material on a front surface or a side surface of the electronic device 101.

Unlike the curved area 210b, the additional area 210c may have a planar shape. According to various embodiments of the present disclosure, the additional area 210c may be disposed in a direction perpendicular to the front area 210a.

According to various embodiments of the present disclosure, a shape or length of the additional area 210c may be changed according to a design requirement. For example, a lengthwise end of the additional area 210c may be changed to be partially curved toward a rear side of the electronic device 101. In the case where the additional area 210c is added, a portion of the bracket 250 disposed at a lower end of the window panel 210 may be formed to be lower than that illustrated in FIG. 2.

In the case where a window area of a side surface extends through the additional area 210c, side surfaces of the electronic device 101 may be simplified in terms of a design.

According to various embodiments of the present disclosure, an area of the touch panel 220 may extend in a shape similar to that of the additional area 210c. Even though the display panel 230 has a shape which burrows into the bracket 250 along a curved surface of the fixed part 240, the touch panel 220 may extend to the same level as the additional area 210c of the window panel 210, thereby making it possible to ensure the touch performance of the side surface of the electronic device 101.

Figure 6:
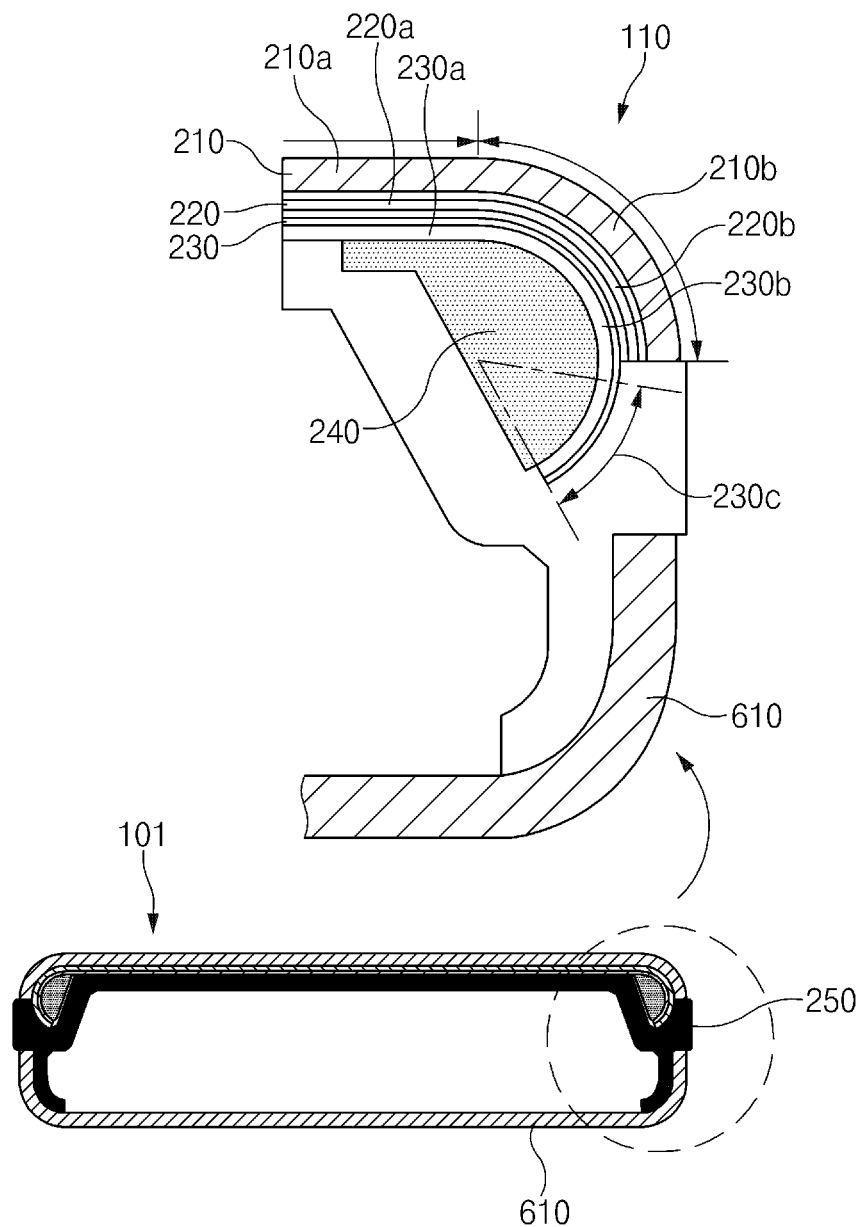
FIG. 6 is a sectional view of an electronic device including a rear glass cover, according to various embodiments of the present disclosure.

FIG. 6 is a sectional view of an electronic device including a rear glass cover, according to various embodiments of the present disclosure.

Referring to FIG. 6, the electronic device 101 includes a rear glass cover 610. According to various embodiments of the present disclosure, the rear glass cover 610 may be formed of the same material as that of the window panel 210.

The window panel 210 may extend to an upper end of an exposed portion of the bracket 250 (or a side case), and the glass cover 610 may cover a lower end of the exposed portion of the bracket 250 (or the side case) and a rear surface of the electronic device 101. The front surface and the rear surface of the electronic device 101 may be formed of a glass material so as to provide the sense of unity in terms of a design. A shape of FIG. 6 is only an example and is not limited thereto. A position or shape of the window panel 210, the rear glass cover 610, or the bracket 610 may be changed according to a design requirement. For example, the window panel 210 may include an additional area as illustrated in FIG. 5. In this case, an area of the rear glass cover 610 which is curved toward a side surface of the electronic device 101 may be relatively reduced.

Figure 7:
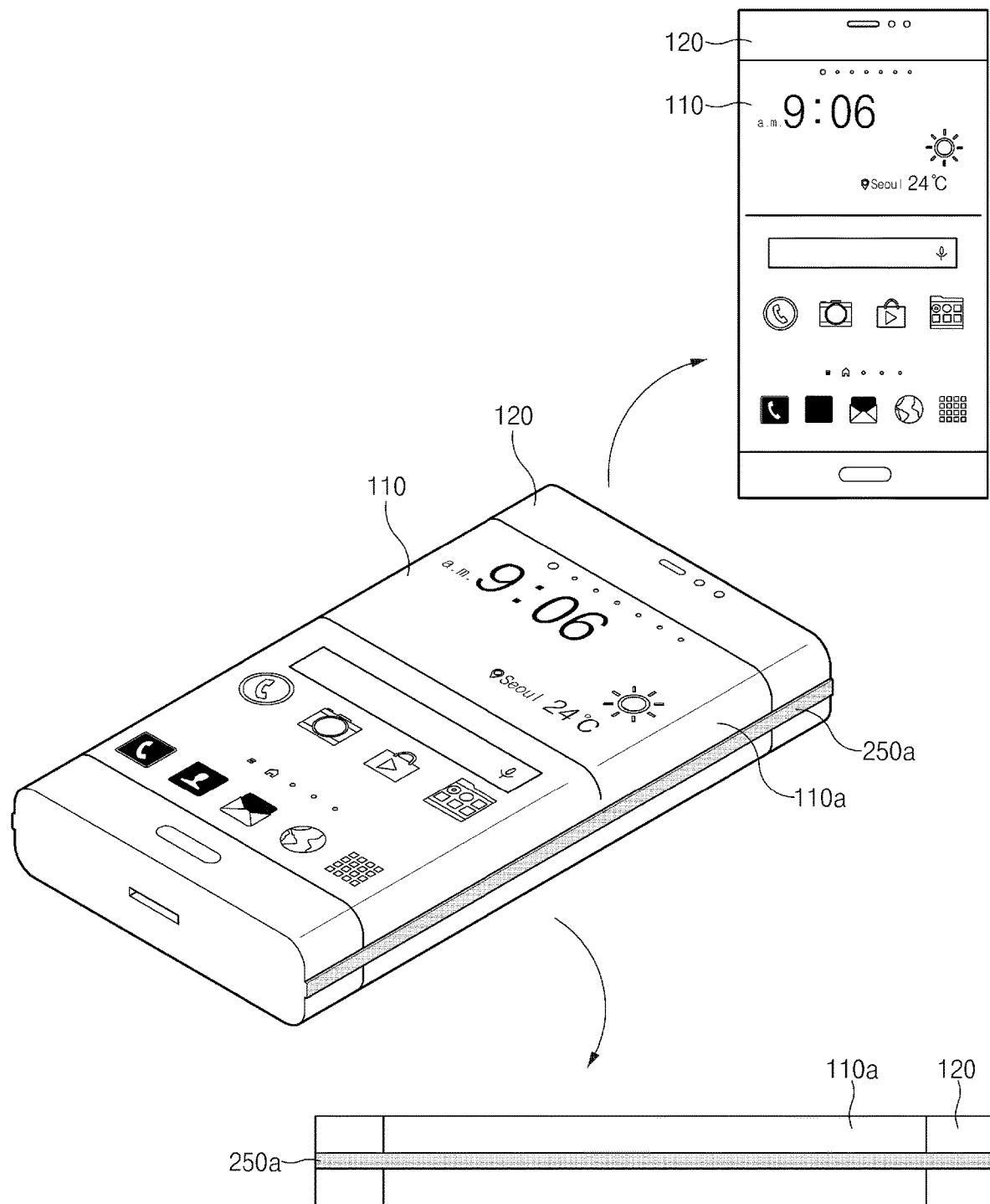
FIG. 7 shows front and side views of an electronic device according to various embodiments of the present disclosure.

FIG. 7 shows front and side views of an electronic device according to various embodiments of the present disclosure.

Referring to FIG. 7, the electronic device 101 includes the display 110 and the body 120. According to various embodiments of the present disclosure, the display 110 extends to the left and right side surfaces of the electronic device 101. A front surface of the display 110 has a planar shape and is curved to be convex toward the outside at points 110a adjacent to the left and right side surfaces of the electronic device 101. The side surface 110a of the display 110 is connected with a bracket 250a (or a case coupled to the bracket 250) exposed at left and right sides of the electronic device 101.

In the front view of the electronic device 101, a bezel area may not be included on left and right side surfaces of the electronic device 101 when viewed from the front side. Furthermore, in the side view of the electronic device 101, a bezel area may not be included on the side surface of the electronic device 101 when viewed from the lateral side resulting from a wiring area included in the display 110 being inserted into and seated in the bracket 250. The electronic device 101 may further include a fixed part for fixing the wiring area in the interior thereof.

Figure 8:
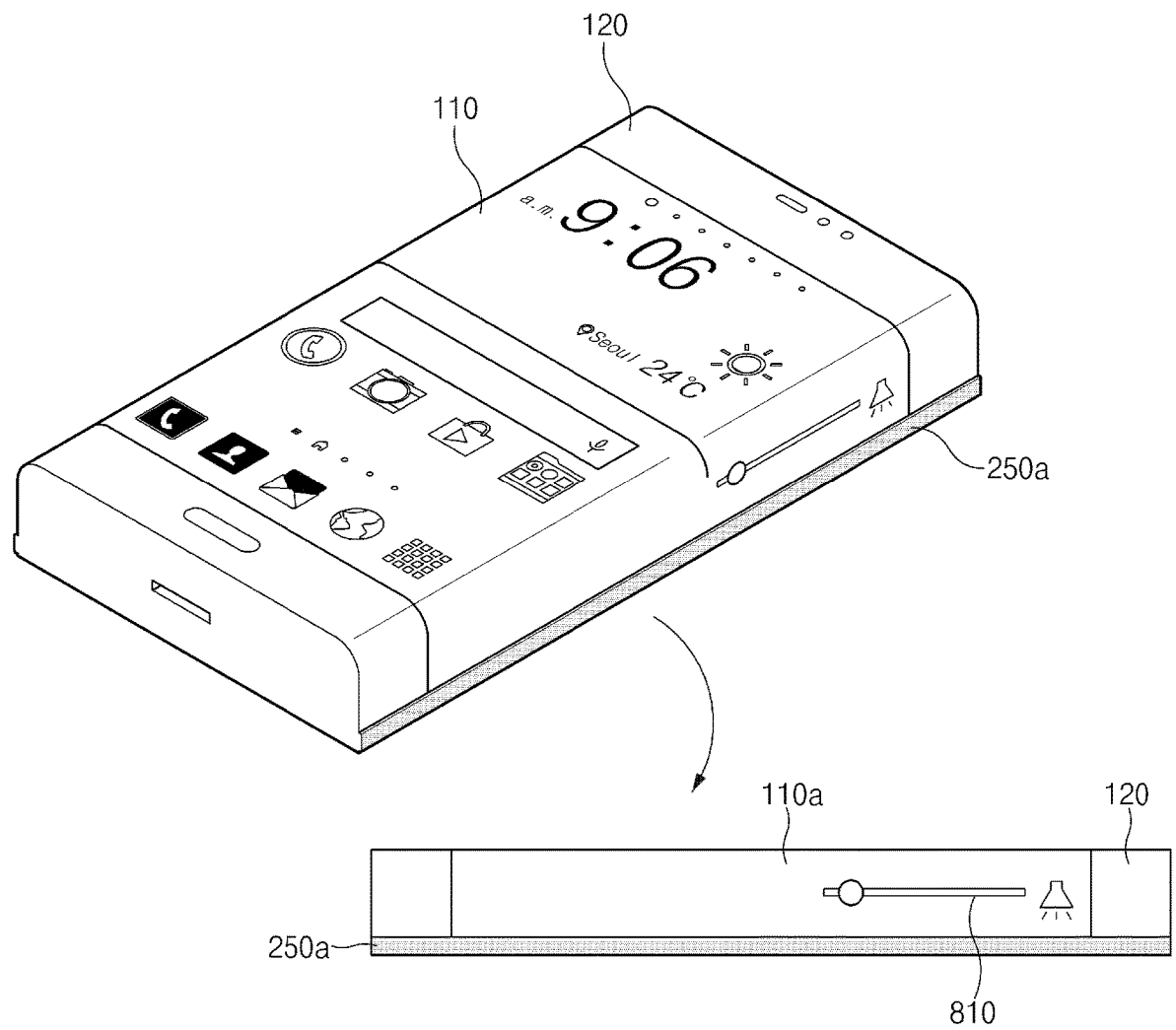
FIG. 8 is a view illustrating an exemplary application of an electronic device according to various embodiments of the present disclosure.

FIG. 8 is a view illustrating an exemplary application of an electronic device according to various embodiments of the present disclosure.

Referring to FIG. 8, the electronic device 101 includes the display 110 and the body 120. In FIG. 8, the window panel 210 of the electronic device 101 includes an additional area as illustrated in FIG. 5. However, the scope and spirit of the present disclosure is not limited thereto. The bracket 250a (or a case coupled to the bracket 250) exposed on left and right sides of the electronic device 101 may be additionally moved from the position shown in FIG. 7 toward a lower end of the electronic device 101.

The electronic device 101 may execute various functions using the side surface 110a. For example, the electronic device 101 may display a volume control button 810. In the case where a user moves a volume bar through a touch operation, the display 110 may provide an internal circuit of the electronic device 101 with a signal generated according to the touch operation. As another example, the electronic device 101 may display buttons (e.g., stop/play/fast forward/rewind) for controlling the playing of a video file on the side surface 110a to allow the user to control the playing of the video file.

The electronic device 101 may not include a separate bezel area on a front surface or a side surface thereof. In the case where the electronic device 101 is a portable device, it may be possible to provide a user interface through a relatively large screen within a limited terminal size to allow the user to utilize the user interface more conveniently.

Figure 9A:
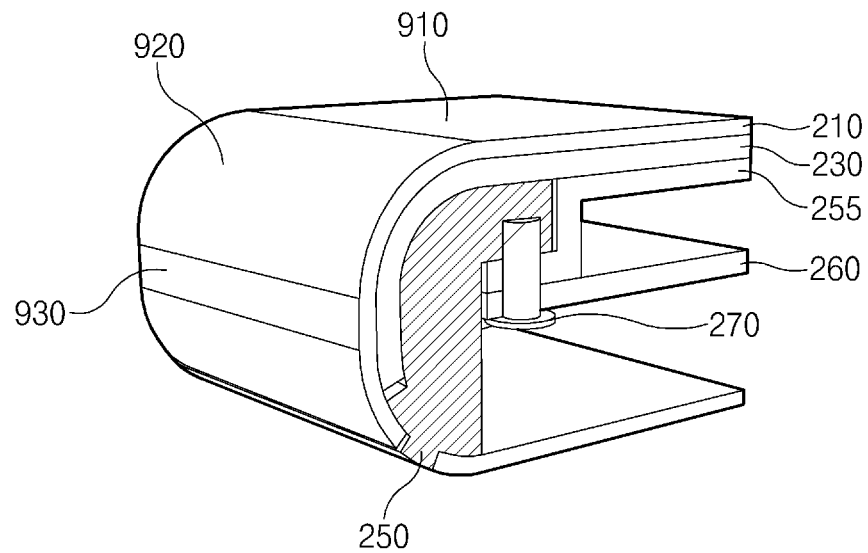
FIGS. 9A and 9B are sectional views of a display according to various embodiments of the present disclosure.
Figure 9B:
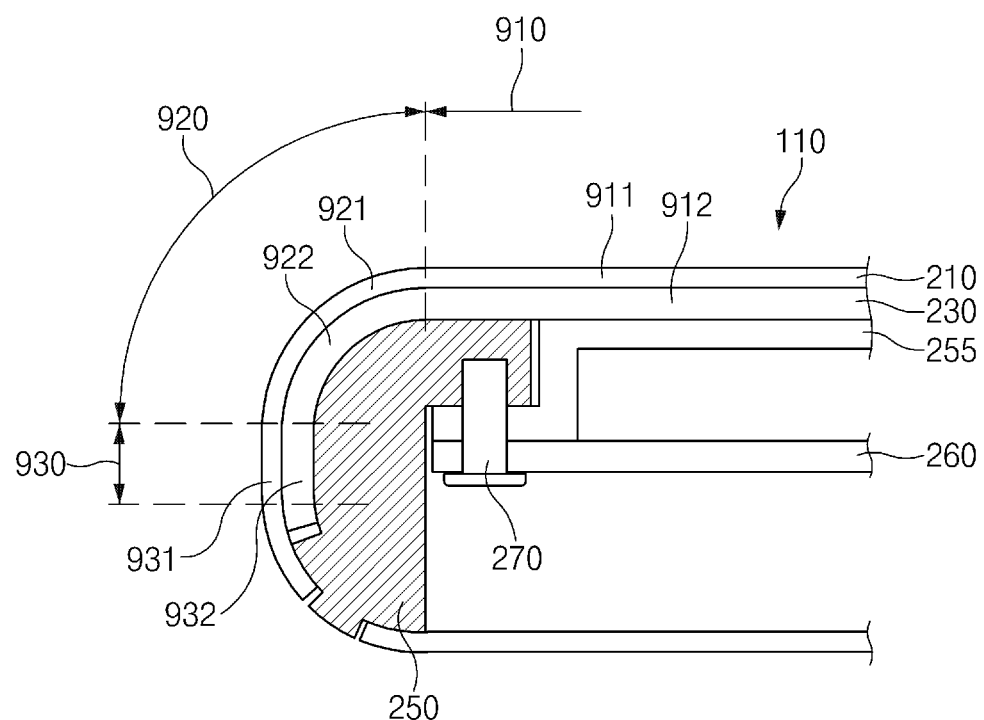

FIGS. 9A and 9B are sectional views of a display according to various embodiments of the present disclosure.

Referring to FIGS. 9A and 9B, left and right side surfaces of the display 110 have a curved shape which is convex toward the outside of the electronic device 101. In the display 110, the window panel 210 and the display panel 230 are stacked. The display 110 includes a front area 910, a first side area 920, and a second side area 930.

The front area 910 may display a variety of content (e.g., a text, an image, a video, an icon, a symbol, and the like). The front area 910 may provide a variety of pieces of information to a user with a screen larger than the first side area 920 or the second side area 930. The first side area 920 or the second side area 930 may be an area which displays specific information to assist the front area 910.

For example, in the case where a message is received in a standby mode, a notification (e.g., a sender ID and a message preview) of the received message may be outputted in the form of pop-up through the first side area 920 during a specific time. In the case where the user touches the first side area 920 within the specific time, the whole content of the message may be displayed on the front area 910. In the case where the user does not confirm the message within the specific time, a specific pattern or icon may be displayed on the second side area 930, thereby making it possible to notify the user that the received message is not confirmed. The case where a message is received is an example of an embodiment, however, the scope and spirit of the present disclosure is not limited thereto. For example, the above-described manner may be applied to provide a notification about a missed call, a notification about a schedule, and the like, and manners to operate the front area 910, the first side area 920, and the second side area 930 may be changed.

The window panel 210 may extend toward side surface areas of the electronic device 101. In this case, the window panel 210 may include a front area 911 of a flat shape, a first curved area 921 of a curved shape, and a second curved area 931 of a curved shape. The areas 911, 921, and 931 may protect the display panel 230 disposed therein, and content output from the areas of the display panel 230 may pass through the areas 911, 921, and 931.

The classification of the front area 911, the first curved area 921, and the third curved area 931 may be based only on a shape or a function. The window panel 210 may be integrally formed of one material at a front surface or a side surface of the electronic device 101. The extension of the window panel 210 may be larger than that of the display panel 230, and the window panel 210 may be formed to have the same height as an externally exposed portion of the bracket 250 so as to form a continuous surface.

The display panel 230 may be disposed below the touch panel 210. The display panel 230 may be formed of a flexible material and may be curved in a shape similar to those of the window panel 210 and the touch panel 220 at side surfaces of the electronic device 101. The display panel 230 may include a front display area 912, a first side display area 922, and a second side display area 932.

The display panel 230 may be curved at a point adjacent to the first bracket 250. The first bracket 250 may allow the first side display area 922 or the second side display area 923 to have a curved shape at a specific radius of curvature.

A second bracket 255 may be disposed below the front display area 912 and may be coupled with the first bracket 250 through a joint 270. Shapes of opposite ends of the second bracket 255 may correspond to that of the first bracket 250.

The joint 270 may couple the first bracket 250, the second bracket 255, and a printed circuit board (PCB) 260. According to various embodiments of the present disclosure, the joint 270 may be inserted in a screw manner.

Figures 10A, 10B:
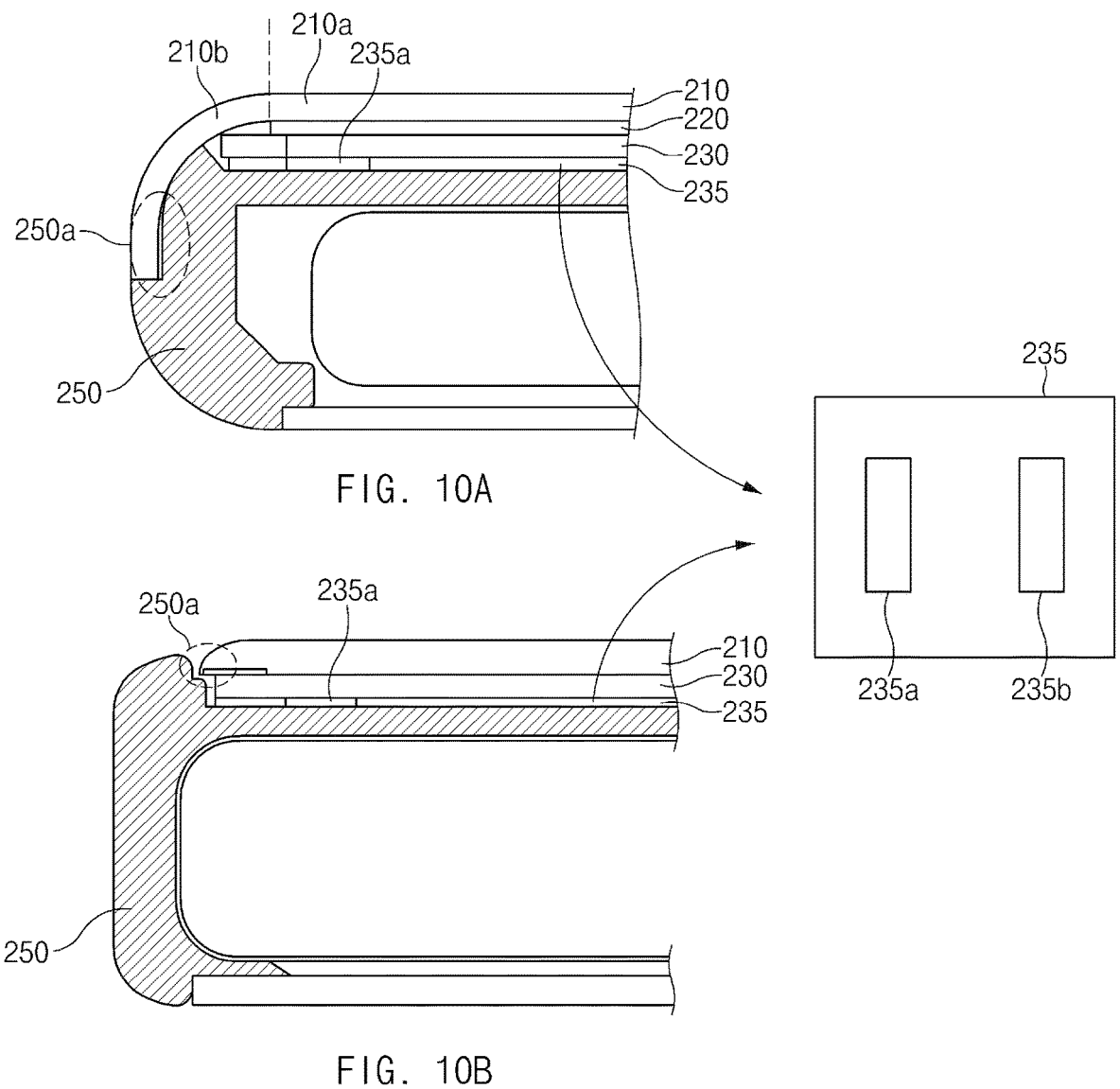
FIGS. 10A and 10B are sectional views illustrating a shape of an adhesive layer according to various embodiments of the present disclosure.

FIGS. 10A and 10B are sectional views illustrating a shape of an adhesive layer according to various embodiments of the present disclosure.

Referring to FIGS. 10A and 10B, the left and right side surfaces of the display 110 have curved shapes which are convex toward the outside. In the display 110, the window panel 210 and the display panel 230 are stacked.

The window panel 210 may extend toward side surface areas of the electronic device 101. In this case, the window panel 210 may include the front area 210a of a planar shape and the curved area 210b of a curved shape. However, the classification of the front area 210a and the curved area 210b may be based only on a shape or a function. The window panel 210 may be integrally formed of one material on a front surface or a side surface of the electronic device 101. The window panel 210 may extend to a range larger than that of the display panel 230, and the window panel 210 may be formed to have the same height as that of an externally exposed portion of the bracket 250 so as to form a continuous surface.

According to various embodiments of the present disclosure, an adhesive layer 220 and an adhesive layer 235 may be disposed between the window panel 210 and the display panel 230 and between the display panel 230 and the bracket 250, respectively. The curved area 210*b* of the window panel 210 and the bracket 250 may be coupled while no separate bonding layer is provided between the window panel 210 and the bracket 250.

According to various embodiments of the present disclosure, the adhesive layer 235 may perform a function of shielding heat or electrical interference noise generated by the display panel 110, in addition to an adhesion function. According to various embodiments, the adhesive layer 235 may include an adhesion area 235*a* and a shield area 235*b*. The adhesion area 235*a* may be an area which is obtained by cutting a portion of a shield sheet and to which a double-sided tape and the like is attached. The shield area 235*b* may be the remaining area other than the adhesive area 235*a* and may shield heat or electrical interference noise generated by the display panel 110.

According to various embodiments of the present disclosure, an electronic device includes a window panel comprising a front area and a curved area extending from the front area, a display panel disposed beneath the window panel, and a fixed part which supports a curved area of the display panel. The display panel includes a front display area, a side display area extending from the front display area so as to be curved, and a wiring area extending from the side display area, and the fixed part supports a curved shape of the side display area or the wiring area.

Figure 11:
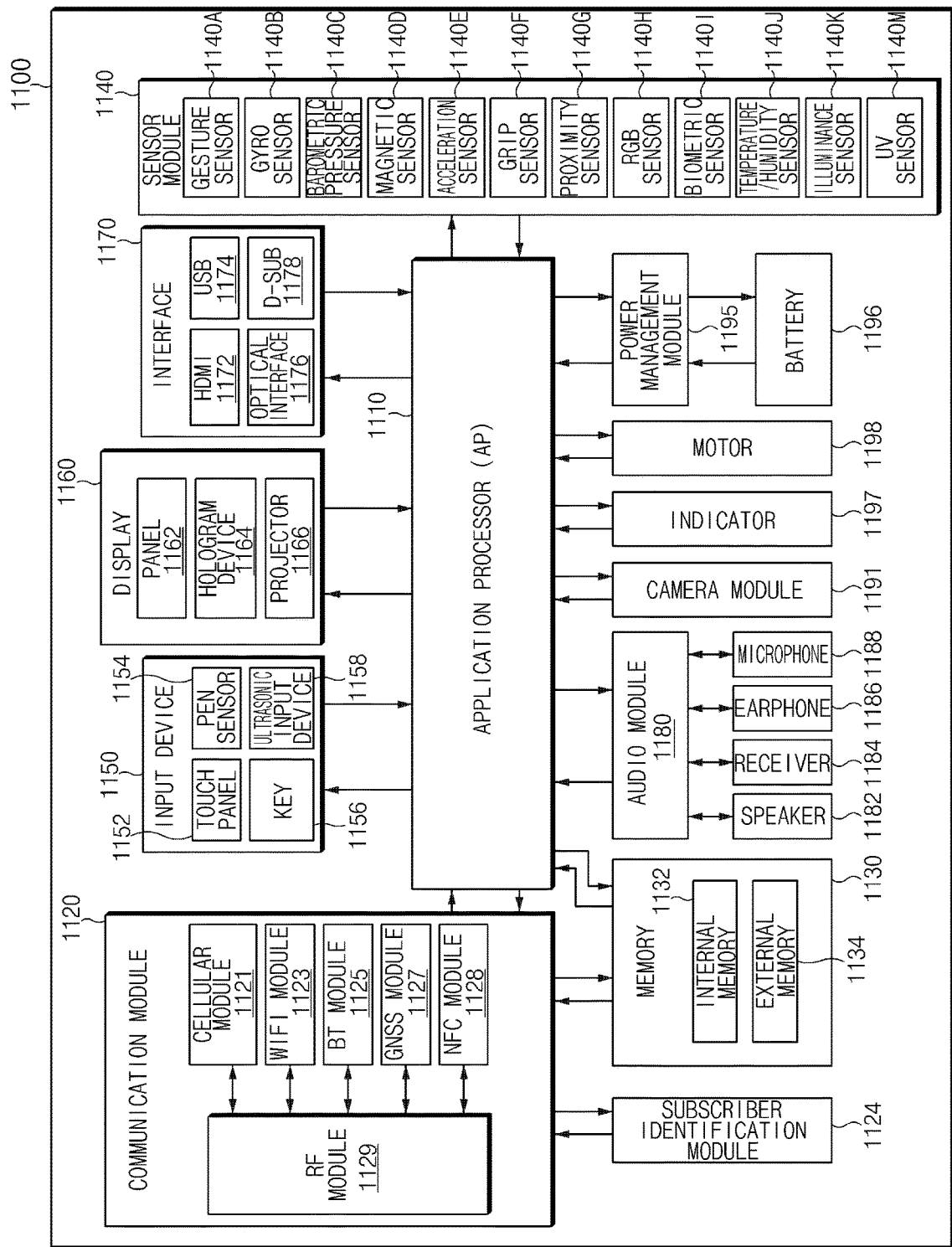
FIG. 11 is a block diagram illustrating an electronic device 1100 according to various embodiments of the present disclosure.

FIG. 11 is a block diagram illustrating an electronic device 1100 according to various embodiments of the present disclosure. An electronic device 1100 may include, for example, all or a part of an electronic device 101 illustrated in FIG. 1. The electronic device 1100 includes one or more application processors (AP) 1110, a communication module 1120, a subscriber identification module 1124, a memory 1130, a sensor module 1140, an input device 1150, a display 1160, an interface 1170, an audio module 1180, a camera module 1191, a power management module 1195, a battery 1196, an indicator 1197, and a motor 1198.

The processor 1110 may drive, for example, an operating system (OS) or an application to control a plurality of hardware or software components connected to the processor 1110 and may process and compute a variety of data. The processor 1110 may be implemented as a system on chip (SoC), for example. According to an embodiment of the present disclosure, the processor 1110 may further include a graphic processing unit (GPU) and/or an image signal processor. The processor 1110 may include at least a part (e.g., a cellular module 1121) of components illustrated in FIG. 11. The processor 1110 may load and process an instruction or data, which is received from at least one of other components (e.g., a nonvolatile memory), and may store a variety of data in a nonvolatile memory.

The communication module 1120 includes a cellular module 1121, a Wi-Fi module 1123, a Bluetooth (BT) module 1125, a GNSS module 1127 (e.g., a GPS module, a Glonass module, a Beidou module, or a Galileo module), a near field communication (NFC) module 1128, and a radio frequency (RF) module 1129.

The cellular module 1121 may provide voice communication, video communication, a text messaging service, an Internet service, and the like, through a communication network. According to an embodiment of the present disclosure, the cellular module 1121 may perform authorization and authentication of the electronic device 1101 within a communication network using the subscriber identification module 1124 (e.g., a SIM card), for example. The cellular module 1121 may perform at least a portion of functions that the processor 1110 provides. The cellular module 1121 may include a communication processor (CP).

Each of the Wi-Fi module 1123, the BT module 1125, the GNSS module 1127, and the NFC module 1128 may include a processor for processing data exchanged through a corresponding module, for example. According to an embodiment of the present disclosure, at least a portion (e.g., two or more components) of the cellular module 1121, the Wi-Fi module 1123, the BT module 1125, the GNSS module 1127, and the NFC module 1128 may be included within one integrated circuit (IC) or an IC package.

The RF module 1129 may transmit and receive a communication signal (e.g., an RF signal). The RF module 1129 may include a transceiver, a power amplifier module (PAM), a frequency filter, a low noise amplifier (LNA), an antenna, and the like. According to various embodiments of the present disclosure, at least one of the cellular module 1121, the Wi-Fi module 1123, the BT module 1125, the GNSS module 1127, or the NFC module 1128 may transmit and receive an RF signal through a separate RF module.

The subscriber identification module 1124 may include, for example, a SIM card and/or an embedded SIM and may include unique identify information (e.g., integrated circuit card identifier (ICCID)) or subscriber information (e.g., integrated mobile subscriber identity (IMSI)).

The memory 1130 includes an internal memory 1132 and an external memory 1134. For example, the internal memory 1132 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), and the like), a hard drive, or a solid state drive (SSD).

The external memory 1134 may include a flash drive, for example, compact flash (CF), secure digital (SD), micro secure digital (Micro-SD), mini secure digital (Mini-SD), extreme digital (xD), multimedia card (MMC), a memory stick, and the like. The external memory 1134 may be functionally and/or physically connected to the electronic device 1101 through various interfaces.

The sensor module 1140 may measure, for example, a physical quantity or may detect an operation state of the electronic device 1101. The sensor module 940 may convert the measured or detected information to an electric signal. The sensor module 1140 includes at least one of a gesture sensor 1140A, a gyro sensor 1140B, a barometric pressure sensor 1140C, a magnetic sensor 1140D, an acceleration sensor 1140E, a grip sensor 1140F, a proximity sensor 1140G, an RGB sensor 1140H (e.g., red, green, blue (RGB) sensor), a biometric sensor 1140I, a temperature/humidity sensor 1140J, an illuminance sensor 1140K, or a UV sensor 1140M. Additionally or alternatively, the sensor module 1140 may include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, and/or a fingerprint sensor. The sensor module 1140 may further include a control circuit for controlling at least one or more sensors included therein. According to an embodiment of the present disclosure, the electronic device 1101 may further include a processor which is a part of the processor 1110 or independent of the processor 1110 and is configured to control the sensor module 1140. The processor may control the sensor module 1140 while the processor 1110 remains in a sleep state.

The input device 1150 includes a touch panel 1152, a (digital) pen sensor 1154, a key 1156, and an ultrasonic input unit 1158. The touch panel 1152 may use at least one of capacitive, resistive, infrared, or ultrasonic detecting methods. Also, the touch panel 1152 may further include a control circuit. The touch panel 1152 may further include a tactile layer to provide a tactile reaction to a user.

The (digital) pen sensor 1154 may be, for example, a part of a touch panel or may include an additional sheet for recognition. The key 1156 may include, for example, a physical button, an optical key, a keypad, and the like. The ultrasonic input device 1158 may detect (or sense) an ultrasonic signal, which is generated from an input device, through a microphone 1188 and may process data corresponding to the detected ultrasonic signal.

The display 1160 includes a panel 1162, a hologram device 1164, and a projector 1166. The panel 1162 may be implemented to be flexible, transparent or wearable, for example. The panel 1162 and the touch panel 1152 may be integrated into a single module. The hologram device 1164 may display a stereoscopic image in a space using a light interference phenomenon. The projector 1166 may project light onto a screen to display an image. The screen may be arranged inside or outside the electronic device 1101. According to an embodiment of the present disclosure, the display 1160 may further include a control circuit for controlling the panel 1162, the hologram device 1164, or the projector 1166.

The interface 1170 includes a high-definition multimedia interface (HDMI) 1172, a universal serial bus (USB) 1174, an optical interface 1176, and a D-subminiature (D-sub) 1178. Additionally or alternatively, the interface 1170 may include, for example, a mobile high definition link (MHL) interface, an SD card/multi-media card (MMC) interface, or an infrared data association (IrDA) standard interface.

The audio module 1180 may convert a sound and an electric signal bidirectionally. The audio module 1180 may process, for example, sound information that is input or output through a speaker 1182, a receiver 1184, an earphone 1186, or the microphone 1188.

The camera module 1191 for capturing a still image or a video may include, for example, at least one image sensor (e.g., a front sensor or a rear sensor), a lens, an image signal processor (ISP), or a flash (e.g., an LED or a xenon lamp).

The power management module 1195 may manage, for example, power of the electronic device 1101. According to an embodiment of the present disclosure, a power management integrated circuit (PMIC), a charger IC, or a battery gauge may be included in the power management module 1195. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1196 and a voltage, current or temperature thereof while the battery is charged. The battery 1196 may include, for example, a rechargeable battery or a solar battery.

The indicator 1197 may display a specific state of the electronic device 1101 or a portion thereof (e.g., the processor 1110), such as a booting state, a message state, a charging state, and the like. The motor 1198 may convert an electrical signal into a mechanical vibration and may generate the following effects: vibration, haptic, and the like. A processing device (e.g., a GPU) for supporting a mobile TV may be included in the electronic device 1101. The processing device for supporting a mobile TV may process media data according to the standards of digital multimedia broadcasting (DMB), digital video broadcasting (DVB), MediaFlo™, and the like.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

According to various embodiments of the present disclosure, a side surface of a display panel may be implemented to be curved and may be fixed through a separate fixed part. As such, a wiring area may be disposed in a bracket inside an electronic device resulting in an electronic device with a bezel-less screen.

According to various embodiments of the present disclosure, a bezel-less screen may be implemented by a panel having a smoothly curved shape, and thus an electronic device with a simplified design shape design may be implemented. Furthermore, it may be possible to use left and right surfaces of the electronic device more efficiently.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A portable communication device comprising:
   a window including a first window area and a second window area extending from the first window area and having a curved surface;
   a display disposed beneath the window and including a first display area, a second display area extending from the first display area and having a curved surface, and a wiring area extending from the second display area;
   a first supporting member configured to support at least one portion of the first display area and at least one portion of the second display area; and
   a second supporting member configured to support the wiring area,
   wherein at least one portion of the wiring area is placed between the first supporting member and the second supporting member.

2. The portable communication device of claim 1, wherein the second window area is curved at a specific radius of curvature so as to be convex toward an outside of the portable communication device.

3. The portable communication device of claim 1, wherein the window further includes an additional window area extending from the second window area, the additional window area forms at least one portion of a side surface of the portable communication device.

4. The portable communication device of claim 3, wherein the display further includes an additional display area corresponding to the additional window area extending from the second display area.

5. The portable communication device of claim 1, wherein the wiring area is seated in the second supporting member so as to be invisible through the window.

6. The portable communication device of claim 1, further comprising:
- a touch panel disposed between the window and the display, and including a first touch area corresponding to the first display area and a second touch area extending from the flat touch area, the second touch area corresponding to the curved second display area.

7. The portable communication device of claim 1, further comprising:
- an adhesive layer disposed between the display and the first supporting member to attach the display and the first supporting member.

8. The portable communication device of claim 1, wherein at least one portion of the second supporting member is exposed from a side surface of the portable communication device so as to form the side surface of the portable communication device.

9. The portable communication device of claim 1, wherein the second supporting member includes a joint to be coupled with the first supporting member.

10. A portable communication device comprising:
- a window including a first window area and a second window area extending from the first window area;
- a display disposed beneath the window and including a first display area, a second display area extending from the first display area, and a wiring area extending from the second display area; and
- a first supporting member disposed beneath the display and supporting the first display area, the second display area and the wiring area.

11. The portable communication device of claim 10, wherein the window further includes an additional window area extending from the second window area, the additional window area forms at least one portion of a side surface of the portable communication device.

12. The portable communication device of claim 10, wherein the wiring area is seated in the first supporting member so as to be invisible through the window.

13. The portable communication device of claim 10, further comprising:
- an adhesive layer disposed between the display and the first supporting member to attach the display and the first supporting member.

14. The portable communication device of claim 10, wherein the first supporting member supports a same side of the second display area and the wiring area.

15. The portable communication device of claim 10, further comprising:
- a second supporting member supporting the wiring area,
- wherein at least one portion of the wiring area is placed between the first supporting member and the second supporting member.

16. The portable communication device of claim 15, wherein at least one portion of the second supporting member is exposed from a side surface of the portable communication device so as to form the side surface of the portable communication device.

17. The portable communication device of claim 15, wherein the wiring area is disposed between the first supporting member and the second supporting member.

18. A portable communication device comprising:
- a window including at least one portion of a curved area;
- a flexible display disposed beneath at least one portion of the window, and including a display area corresponding to the window and a wiring area extending from the display area; and
- a first supporting member supporting a same side of at least one portion of the display area and at least one portion of the wiring area.

19. The portable communication device of claim 18, further comprising:
- a second supporting member supporting the wiring area.

20. The portable communication device of claim 19, wherein at least one portion of the wiring area is placed between the first supporting member and the second supporting member.

* * * * *